(12) United States Patent
Higashi et al.

(10) Patent No.: US 10,603,720 B2
(45) Date of Patent: Mar. 31, 2020

(54) BONDED DIAMOND BODY, TOOL COMPRISING THE SAME, AND METHOD FOR MANUFACTURING BONDED DIAMOND BODY

(71) Applicants: SUMITOMO ELECTRIC HARDMETAL CORP., Itami-shi (JP); Sumitomo Electric Industries, Ltd., Osaka-shi (JP)

(72) Inventors: Taisuke Higashi, Itami (JP); Tadashi Yamaguchi, Itami (JP); Shinichiro Yurugi, Itami (JP); Mari Sogabe, Itami (JP)

(73) Assignees: Sumitomo Electric Hardmetal Corp., Itami-shi (JP); Sumitomo Electric Industries, Ltd., Osaka-shi (JP)

(*) Notice: Subject to any disclaimer, the term of this patent is extended or adjusted under 35 U.S.C. 154(b) by 446 days.

(21) Appl. No.: 15/026,286

(22) PCT Filed: Oct. 8, 2014

(86) PCT No.: PCT/JP2014/076928
§ 371 (c)(1),
(2) Date: Mar. 31, 2016

(87) PCT Pub. No.: WO2015/072250
PCT Pub. Date: May 21, 2015

(65) Prior Publication Data
US 2016/0221080 A1    Aug. 4, 2016

(30) Foreign Application Priority Data
Nov. 15, 2013 (JP) .................. 2013-236971

(51) Int. Cl.
*B22F 7/06* (2006.01)
*C22C 26/00* (2006.01)
(Continued)

(52) U.S. Cl.
CPC ............ *B22F 7/064* (2013.01); *B22F 5/00* (2013.01); *B22F 7/06* (2013.01); *B23B 27/20* (2013.01);
(Continued)

(58) Field of Classification Search
None
See application file for complete search history.

(56) References Cited

U.S. PATENT DOCUMENTS

| 4,797,326 A | 1/1989 | Csillag | |
| 5,304,342 A * | 4/1994 | Hall, Jr. | ........... B01J 3/062 51/293 |

(Continued)

FOREIGN PATENT DOCUMENTS

| CN | 86108847 A | 8/1987 |
| CN | 102131575 A | 7/2011 |

(Continued)

OTHER PUBLICATIONS

"Equiaxed." Merriam-Webster.com. Accessed May 16, 2018. https://www.merriam-webster.com/dictionary/equiaxed.*

(Continued)

*Primary Examiner* — Colleen P Dunn
*Assistant Examiner* — Ross J Christie
(74) *Attorney, Agent, or Firm* — Baker Botts L.L.P.; Michael A. Sartori

(57) ABSTRACT

A bonded diamond body having a high bonded strength is provided. The bonded diamond body includes a sintered polycrystalline diamond body, a hard substrate, and a hard layer provided between the sintered polycrystalline diamond body and the hard substrate, the sintered polycrystalline diamond body containing a diamond grain and a sintering aid, the hard substrate containing tungsten carbide and cobalt, and the hard layer containing cobalt and a hard grain (Continued)

made of a carbide, a nitride, or a carbonitride having a Vickers hardness of 1100 Hv or more.

3 Claims, 5 Drawing Sheets

(51) Int. Cl.
*B23B 27/20* (2006.01)
*B22F 5/00* (2006.01)
*B24D 3/06* (2006.01)
*B24D 18/00* (2006.01)
*C22C 29/00* (2006.01)
*C22C 29/02* (2006.01)

(52) U.S. Cl.
CPC ........... *B24D 3/06* (2013.01); *B24D 18/0009* (2013.01); *C22C 26/00* (2013.01); *C22C 29/005* (2013.01); *C22C 29/02* (2013.01); B22F 2005/001 (2013.01); B23B 2226/315 (2013.01); C22C 2204/00 (2013.01)

(56) References Cited

U.S. PATENT DOCUMENTS

| | | | | |
|---|---|---|---|---|
| 5,510,193 | A | * | 4/1996 | Cerutti ................. B01J 3/062 428/545 |
| 6,713,172 | B2 | * | 3/2004 | Ljungberg ............ C23C 16/403 407/118 |
| 7,153,562 | B2 | * | 12/2006 | Rodmar ................ B23B 27/145 428/216 |
| 2003/0162648 | A1 | * | 8/2003 | Middlemiss .......... C04B 35/628 428/698 |
| 2010/0038147 | A1 | * | 2/2010 | Lockstedt ............. B22F 1/0096 175/426 |
| 2011/0214921 | A1 | | 9/2011 | Naidoo |
| 2011/0252712 | A1 | * | 10/2011 | Chakraborty ............ B01J 3/062 51/307 |
| 2012/0103699 | A1 | * | 5/2012 | Yu ............................. B22F 3/12 51/307 |
| 2013/0047397 | A1 | * | 2/2013 | Jonker ..................... B22F 7/06 29/419.1 |
| 2013/0048389 | A1 | | 2/2013 | Bao et al. |
| 2016/0230473 | A1 | * | 8/2016 | Davies ................ E21B 10/5735 |

FOREIGN PATENT DOCUMENTS

| | | |
|---|---|---|
| CN | 102858482 A | 1/2013 |
| EP | 0706981 A2 | 4/1996 |
| JP | 62-086102 A | 4/1987 |
| JP | S63111104 A | 5/1988 |
| JP | 8-231281 A | 9/1996 |
| JP | 2010-208942 A | 9/2010 |
| JP | 2013-519530 A | 5/2013 |

OTHER PUBLICATIONS

International Search Report in PCT International Application No. PCT/JP2014/076928, dated Jan. 6, 2015.
International Preliminary Report on Patentability in PCT International Application No. PCT/JP2014/076928, dated Jul. 7, 2015.

* cited by examiner

BONDED DIAMOND BODY, TOOL COMPRISING THE SAME, AND METHOD FOR MANUFACTURING BONDED DIAMOND BODY

TECHNICAL FIELD

The present invention relates to a bonded diamond body, a tool comprising the bonded diamond body, and a method for manufacturing the bonded diamond body.

BACKGROUND ART

Diamond has an extremely high hardness, and sintered polycrystalline diamond bodies (hereinafter also referred to as "PCDs") manufactured from diamond grains as a raw material are used in a variety of tools such as cutting tools, wear-resistant tools, etc.

When a PCD is used in a tool, the PCD is generally used by bonding a bonded body obtained by bonding the PCD to a hard substrate (hereinafter also referred to as a "bonded PCD body") to a base metal serving as the base body of the tool. For example, Japanese Patent Laying-Open No. 2010-208942 (PTD 1) discloses a method for manufacturing a bonded PCD body, wherein a mixed power, which is a mixture of a diamond powder and a binder powder, positioned on a disk made of a cemented carbide as a substrate, is loaded into a container made of tantalum (Ta) and sintered under high temperature and high pressure.

CITATION LIST

Patent Document

PTD 1: Japanese Patent Laying-Open No. 2010-208942

SUMMARY OF INVENTION

Technical Problem

With the conventional manufacturing method, however, the bonded strength between the PCD and the hard substrate in the resulting bonded PCD body may be low. When this bonded PCD body having a low bonded strength is used in a tool, a portion or all of the PCD may be detached from the tool when the tool is used to machine a workpiece.

The present invention aims to solve the problem described above, and provide a bonded PCD body (bonded diamond body) having a high bonded strength, a tool including the bonded PCD body, and a method for manufacturing the bonded PCD body (bonded diamond body).

Solution to Problem

A first embodiment of the present invention provides a bonded diamond body including a sintered polycrystalline diamond body, a hard substrate, and a hard layer provided between the sintered polycrystalline diamond body and the hard substrate, the sintered polycrystalline diamond body containing a diamond grain and a sintering aid, the hard substrate containing tungsten carbide and cobalt, and the hard layer containing cobalt and a hard grain made of a carbide, a nitride, or a carbonitride having a Vickers hardness of 1100 Hv or more.

A second embodiment of the present invention provides a tool including the bonded diamond body described above.

A third embodiment of the present invention provides a method for manufacturing a bonded diamond body including the steps of preparing a compact including a hard grain positioned on a hard substrate and a diamond grain and a sintering aid positioned on the hard grain; and sintering the compact under a pressure not less than 5.0 GPa and not more than 7.5 GPa and a temperature not less than 1300° C. and not more than 1900° C., the hard substrate containing tungsten carbide and cobalt, and the hard grain being made of a carbide, a nitride, or a carbonitride having a Vickers hardness of 1100 Hv or more.

Advantageous Effects of Invention

According to the present invention, a bonded PCD body having a high bonded strength, a tool including the bonded PCD body, and a method for manufacturing the bonded PCD body can be provided.

DESCRIPTION OF EMBODIMENTS

Figure 1:
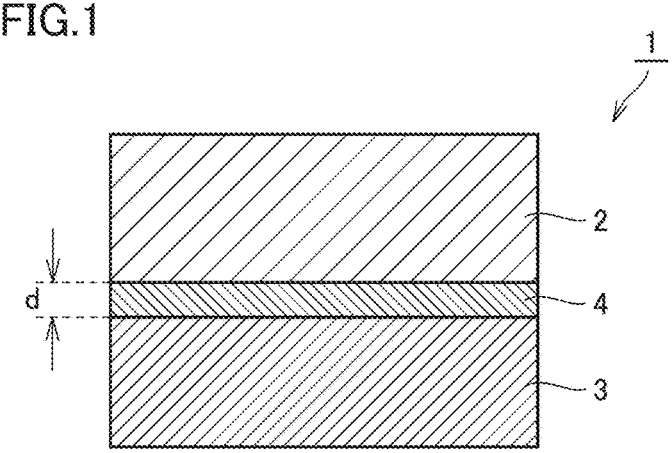
FIG. 1 is a schematic cross-sectional view of a bonded PCD body according to one embodiment.

Description of Embodiments of the Present Invention

First, a summary of embodiments of the present invention will be described.

As a result of their extensive study to produce a bonded PCD body having a high bonded strength between a PCD and a hard substrate, the present inventors obtained the following finding, thus completing the present invention.

The present inventors first produced a plurality of bonded PCD bodies by preparing a plurality of compacts in which diamond grains as a raw material of a PCD and cobalt (Co) as a sintering aid are positioned on a hard substrate, and by sintering these compacts under high temperature and high pressure. The inventors then observed the structure of each of the bonded PCD bodies with an electron microscope to confirm that some bonded PCD bodies did not contain (sintered) diamond grains exhibiting abnormal grain growth while others contained such grains, at the interface between the PCD and the hard substrate.

When the (sintered) diamond grains exhibiting abnormal grain growth are not present at the interface between the PCD and the hard substrate, residual stress is induced in this interface due to a difference in thermal expansion coefficient between the hard substrate, and the PCD composed of the (sintered) diamond grains and Co. On the other hand, when the (sintered) diamond grains exhibiting abnormal grain growth are present at the interface between the PCD and the hard substrate, residual stress is induced in this interface due to a difference in thermal expansion coefficient between the hard substrate and the (sintered) diamond grains exhibiting abnormal grain growth. The difference in thermal expansion coefficient in the latter case is greater than that in the former case, and thus, the residual stress in the latter case is higher than that in the former case. A high residual stress in the interface results in a low bonded strength between two materials forming the interface. It is believed that in the latter case, the bonded strength between the PCD and the hard substrate is reduced.

The present inventors inferred that a reason why those bonded PCD bodies containing the diamond grains exhibiting abnormal grain growth and those not containing such grains were manufactured as described above, regardless of the fact that the plurality of bonded PCD bodies were manufactured under the same conditions, may be as follows.

When a layer containing diamond grains is positioned on a hard substrate containing Co and then this material is sintered, the Co contained in the hard substrate diffuses into the layer containing the diamond grains. If the amount of diffused Co is large, unintended excess Co will be included in the layer containing the diamond grains. Because Co serves to promote the grain growth of the diamond grains, abnormal grain growth of diamond grains is likely to occur at the interface where excess Co contacts the diamond grains. If the abnormal grain growth of diamond grains occurs at the interface between the PCD and the hard substrate, a high residual stress will be induced in this interface, resulting in a reduced bonded strength between the PCD and the hard substrate. The abnormal grain growth can be caused by, for example, unevenness in temperature within a sintering furnace, variations in the positions where the compacts are positioned within the sintering furnace, etc. The abnormal grain growth is difficult to control because of its high occurrence or growth rate. For this reason, regardless of being sintered under the same conditions, bonded PCD bodies containing diamond grains exhibiting abnormal grain growth and those not containing such grains are manufactured.

The present inventors therefore conducted extensive study to suppress excessive diffusion of Co from a hard substrate, and found that the bonded strength of a bonded PCD body can be improved by positioning specific hard grains between diamond grains and the hard substrate, and sintering the resulting material, thus completing the present invention.

(1) A bonded polycrystalline diamond body according to an embodiment of the present invention is a bonded diamond body including a sintered polycrystalline diamond body, a hard substrate, and a hard layer provided between the sintered polycrystalline diamond body and the hard substrate, the sintered polycrystalline diamond body containing a diamond grain and a sintering aid, the hard substrate containing tungsten carbide and cobalt, and the hard layer containing cobalt and a hard grain made of a carbide, a nitride, or a carbonitride having a Vickers hardness of 1100 Hv or more. The bonded polycrystalline diamond body according to this embodiment can have a high bonded strength.

(2) In the bonded polycrystalline diamond body according to an embodiment of the invention, preferably, the hard layer contains the cobalt in a proportion of not less than 5 vol % and not more than 30 vol %. The hard layer can thus have a high bending strength.

(3) In the bonded polycrystalline diamond body according to an embodiment of the invention, preferably, the hard grain has a volume average grain size not smaller than a volume average grain size of the diamond grain. The bonded polycrystalline diamond body can thus have a higher bonded strength.

(4) In the bonded polycrystalline diamond body according to an embodiment of the invention, preferably, the hard grain has an aspect ratio of 2.5 or less. The bonded polycrystalline diamond body can thus have a higher bonded strength.

(5) In the bonded polycrystalline diamond body according to an embodiment of the invention, preferably, the hard layer has a thickness not less than 10 µm and not more than 400 µm. The hard layer can thus have a higher hardness.

(6) In the bonded polycrystalline diamond body according to an embodiment of the invention, preferably, the diamond grain has a maximum grain size of 50 µm or less. The bonded polycrystalline diamond body can thus have a higher bonded strength.

(7) A tool according to an embodiment of the invention is a tool including the bonded polycrystalline diamond body described above. The tool according to this embodiment, which includes the bonded polycrystalline diamond body having a high bonded strength, can have high chipping resistance.

(8) A method for manufacturing a bonded polycrystalline diamond body according to an embodiment of the invention includes the steps of preparing a compact including a hard grain positioned on a hard substrate and a diamond grain and a sintering aid positioned on the hard grain; and sintering the compact under a pressure not less than 5.0 GPa and not more than 7.5 GPa and a temperature not less than 1300° C. and not more than 1900° C., the hard substrate containing tungsten carbide and cobalt, and the hard grain being made of a carbide, a nitride, or a carbonitride having a Vickers hardness of 1100 Hv or more. With the method for manufacturing a bonded polycrystalline diamond body according to this embodiment, the bonded PCD body described above, i.e., a bonded polycrystalline diamond body having a high bonded strength, can be manufactured.

(9) In the method for manufacturing a bonded polycrystalline diamond body according to this embodiment, preferably, the hard grain has a volume average grain size not smaller than a volume average grain size of the diamond grain. This allows a bonded polycrystalline diamond body having a higher bonded strength to be manufactured.

(10) In the method for manufacturing a bonded polycrystalline diamond body according to this embodiment, preferably, the hard grain has an aspect ratio of 2.5 or less. This allows a bonded polycrystalline diamond body having a higher bonded strength to be manufactured.

(11) In the method for manufacturing a bonded polycrystalline diamond body according to this embodiment, preferably, the hard grain is positioned, on the hard substrate, as a layer having a thickness not less than 10 µm and not more than 400 µm. This allows a hard layer having a higher hardness to be formed.

(12) In the method for manufacturing a bonded polycrystalline diamond body according to this embodiment, preferably, the diamond grain after the step of sintering has a maximum grain size of 50 µm or less. This allows a bonded polycrystalline diamond body having a higher bonded strength to be manufactured.

Details of Embodiments of the Invention

Embodiments of the present invention will be described in further detail below with reference to the drawings, in which identical or corresponding parts are indicated by identical reference numbers, and description thereof will not be repeated.

First Embodiment

Bonded PCD Body

FIG. 1 is a schematic cross-sectional view of a bonded PCD body according to one embodiment. Referring to FIG. 1, a bonded PCD body 1 includes a sintered polycrystalline diamond body (PCD) 2, a hard substrate 3, and a hard layer 4 provided between PCD 2 and hard substrate 3.

PCD 2 contains diamond grains and a sintering aid. Hard substrate 3 contains tungsten carbide (WC) and cobalt (Co). Hard layer 4 contains Co and hard grains made of a carbide, a nitride, or a carbonitride having a Vickers hardness of 1100 Hv or more. Hard layer 4 is one feature of bonded PCD body 1 according to this embodiment, and the presence of hard layer 4 in bonded PCD body 1 can provide an increased bonded strength of bonded PCD body 1 compared to that of conventional bonded PCD bodies. Although the reason therefor is not clear, the present inventors consider it as follows.

The present inventors found that bonded PCD body 1 including hard layer 4 between PCD 2 and hard substrate 3 can be manufactured as follows. First, a compact is prepared by positioning (unsintered) hard substrate 3 in a mold, molding hard grains as the material of hard layer 4 into a layer on hard substrate 3, and molding a mixed powder of diamond grains and a sintering aid as the materials of PCD 2 into a layer on hard layer 4. Next, this compact is sintered under high temperature and high pressure, thereby manufacturing bonded PCD body 1 in which hard layer 4 containing the hard grains and Co is formed between hard substrate 3 and PCD 2.

It is believed that a reason why Co is contained in hard layer 4, regardless of the fact that only the hard grains are used as the material of hard layer 4, in the manufacturing method described above, is that the Co diffused from hard substrate 3 into the diamond grains during sintering is absorbed and retained between the hard grains. Diffusion of Co into the diamond grains is suppressed because the Co is absorbed and retained between the hard grains. This suppresses abnormal grain growth at the interface of the diamond grains due to the presence of excess Co.

Residual stress within bonded PCD body 1 can thus be reduced compared to that when abnormal grain growth is not suppressed. This results in an increased bonded strength of bonded PCD body 1 compared to that of conventional bonded PCD bodies. Note that the presence of hard layer 4 does not reduce the strength of bonded PCD body 1 because the regions between the hard grains are filled with the diffused Co in hard layer 4, and because the hard grains are bonded to each other with Co as the sintering aid and have a high hardness per se.

As used herein, the term a high bonded strength of the bonded PCD body means that the PCD is unlikely to be detached from the bonded PCD body, and that the PCD is firmly bonded to the hard substrate. Thus, for example, when a bonded PCD body having a high bonded strength and a bonded PCD body having a low bonded strength are subjected to a force of the same magnitude and in the same direction, the bonded PCD body having a high bonded strength does not experience detachment of the PCD, while the bonded PCD body having a low bonded strength experiences detachment of the PCD.

The degree of the bonded strength as described above can be evaluated using the following method.

Figure 2:
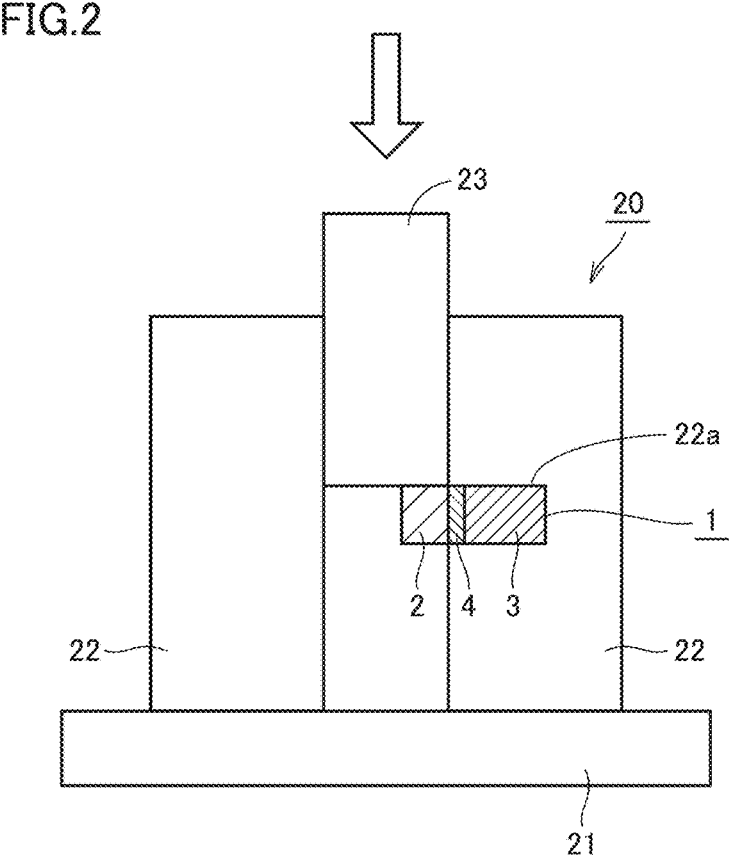
FIG. 2 is a cross-sectional view for schematically illustrating a method of measuring the bonded strength of the bonded PCD body.

FIG. 2 is a cross-sectional view for schematically illustrating a method of measuring the bonded strength of the bonded PCD body. Referring to FIG. 2, a shearing tester 20 includes a mount 21, columns 22, and a head 23. Two columns 22 are vertically arranged on mount 21 with a certain gap therebetween, and one of columns 22 has a retaining portion 22a depressed in the form of a U-shape for fixedly retaining bonded PCD body 1 as a specimen. Head 23 is inserted through the gap between columns 22, and can slide vertically downward in the figure.

In shearing tester 20 described above, bonded PCD body 1 is fixed to retaining portion 22a of column 22. At this time, bonded PCD body 1 is fixed such that a portion of bonded PCD body 1 whose bonded strength is to be measured is positioned at a boundary between the inside and the outside of retaining portion 22a (boundary between an outer end of the rectangular space surrounded by retaining portion 22a and the gap between columns 22). In FIG. 2, the interface between PCD 2 and hard layer 4 is positioned at the boundary between the inside and the outside of retaining portion 22a. In this case, therefore, the bonded strength of the interface between PCD 2 and hard layer 4 is measured.

In shearing tester 20 shown in FIG. 2 in which bonded PCD body 1 is fixed, a predetermined load in the downward direction is applied to head 23, as shown by the arrow shown in the figure. This causes head 23 to slide downward, and to be pressed against PCD 2 exposed from retaining portion 22a. The load being applied on head 23 is then increased with head 23 pressed against PCD 2. The bonded strength can be measured as the load being applied to head 23 when bonded PCD body 1 is broken.

Note that if PCD 2 or hard layer 4 is relatively small in thickness, it may be difficult to fix the interface between PCD 2 and hard layer 4 or the interface between hard layer 4 and hard substrate 3 so as to be positioned at the boundary between the inside and the outside of retaining portion 22a as described above. In this case, both interfaces may be positioned to lie at least outside retaining portion 22a (in the gap between columns 22), so that a load is applied to both interfaces. In this way, although the bonded strength of each of the interfaces cannot be measured individually, it is believed that an interface having a lower bonded strength will be broken first, and thus, the bonded strength of at least bonded PCD body 1 as a whole can be measured.

Referring to FIG. 1, each element forming bonded PCD body 1 will be described in detail below.

<Sintered Polycrystalline Diamond Body (PCD)>

PCD 2 is a material obtained by sintering diamond grains with a sintering aid. That is, PCD 2 has a diamond phase made of the diamond grains and a first binder phase made of the sintering aid. Note that PCD 2 contains inevitable impurities, in addition to the diamond grains and the sintering aid.

The proportion of the diamond grains contained in PCD 2 is preferably not less than 70 vol % and not more than 98 vol %, and more preferably not less than 80 vol % and not more than 98 vol %. If the proportion of the diamond grains is less than 70 vol %, a sufficient hardness of PCD 2 may not be obtained, while if the proportion of the diamond grains is more than 98 vol %, a relative decrease in the proportion of the sintering aid may lead to a weak bond between the diamond grains or unevenness in the degree of the bond. Note that the proportion of the sintering aid contained in PCD 2 is preferably more than 2 vol % and less than 30 vol %, for the same reason as described above.

The proportion of the diamond grains contained in PCD 2 is herein calculated using the following method. First, a cross section of PCD 2 is mirror-polished, and a reflection electron image of a given region of PCD 2 is observed with an electron microscope at a magnification of 5000 times. At this time, the diamond phase made of the diamond grains is observed as a black region, and the first binder phase made of the sintering aid is observed as a gray or white region. Next, the diamond phase region and the first binder phase region in the observed view image are binarized by image processing, and an occupancy area of the diamond phase region is measured. The volume content of the diamond grains is then calculated by substituting the occupancy area into equation (1):

$$\text{(volume content of diamond phase)} = \text{(occupancy area of diamond phase)} \div \text{(area of PCD 2 in the view image)} \times 100 \qquad (1)$$

While the thickness of PCD 2 (in the vertical direction in FIG. 1) is not particularly limited, it is preferably not less than 0.10 mm and not more than 1.5 mm for the application shown in FIG. 1.

PCD 2 may also contain a cobalt-rich layer having a predetermined thickness from the interface with hard layer 4 and exhibiting a high proportion (vol %) of cobalt. When PCD 2 contains the cobalt-rich layer, residual stress due to a difference in thermal expansion coefficient between PCD 2 and hard layer 4 can be reduced.

(Diamond Grains)

The diamond grains preferably have a volume average grain size not less than 0.1 µm and not more than 50 µm. If the volume average grain size of the diamond grains exceeds 50 µm, defects due to the cleavability of the diamond grains per se tend to form. If such defects due to the cleavability form in the diamond phase, defects tend to form within PCD 2. Moreover, grains having a grain size of less than 0.1 µm are difficult to manufacture and complicated to handle. The volume average grain size of the diamond grains is more preferably not less than 0.1 µm and not more than 30 µm, and even more preferably not less than 0.1 µm and not more than 5 µm.

As used herein, the term "volume average grain size" refers to a median size (d50) in a grain size distribution (volume distribution) on a volume basis, and refers to an average grain size of all of the diamond grains contained in PCD 2. Note that the "volume average grain size" herein may simply be referred to as the "grain size".

The grain size of each grain for calculating the grain size (volume average grain size) of the diamond grains can be measured using the following method. First, a cross section of sintered polycrystalline diamond body 2 is mirror-polished, and a reflection electron image of a given region of sintered polycrystalline diamond body 2 is observed at a magnification of 5000 times with an electron microscope. Next, in this reflection electron image, a diameter of a circle circumscribing a grain forming the diamond phase (i.e., a diameter corresponding to a circumcircle) is measured, and this diameter is determined as the grain size of the diamond grain.

Note that the grain size of the diamond grains contained in PCD 2 (excluding diamond grains exhibiting abnormal grain growth) tends to be the same as the grain size of the diamond grains used as the material of PCD 2, i.e., unsintered diamond grains. In particular, when the grain size of the diamond grains is lower (for example, 10 µm or less), there is a higher tendency for the grain size of each of the diamond grains to be the same before and after sintering.

In PCD 2, the diamond grains may each be present in the form of individual grains, or may be present with adjacent grains bonded to each other, i.e., with neck growth being formed. Note that, however, from the viewpoint of obtaining PCD 2 with a higher strength, it is preferable that 90 vol % or more of the diamond grains forming the diamond phase be present with neck growth being formed. Whether the diamond grains are present individually or present with neck growth being formed, as well as the volume % thereof, can be controlled by the type and the amount of the added sintering aid described below.

Note that bonded PCD body 1 according to this embodiment exhibits suppressed abnormal grain growth at the interface of the diamond grains, compared to a conventional bonded diamond body without the hard layer, as described above. The diamond grains forming PCD 2 can therefore have features as set forth in (1) to (3) below, for example.

(1) A maximum grain size of 50 µm or less of the diamond grains contained in PCD 2; when the diamond grains contained in PCD 2 have this feature, it can be assumed that abnormal grain growth at the interface of the diamond grains is sufficiently suppressed, and hence, the bonded strength of the bonded diamond body (bonded PCD body) is sufficiently increased. The maximum grain size of the diamond grains is more preferably 30 µm or less, and even more preferably 5 µm or less.

As used herein, the term "maximum grain size of the diamond grains" refers to a maximum value of the grain size of the diamond grains contained in the bonded diamond body after a sintering step. That is, this maximum grain size refers to a maximum value of the grain growth of the diamond grains at the interface between the sintered polycrystalline diamond body (PCD) and the hard layer, for example, a maximum grain size of the diamond grains in contact with or proximate to the hard layer. The grain diameter of the diamond grains can be measured as in the method of measuring the grain size of each grain for calculating the grain size (volume average grain size) of the diamond grains described above.

(2) A maximum grain size of the diamond grains contained in PCD 2 that is not more than three times the average grain size of the diamond grains; when the diamond grains contained in PCD 2 have this feature, it can be assumed that abnormal grain growth at the interface of the diamond grains is sufficiently suppressed, and hence, the bonded strength of the bonded diamond body (bonded PCD body) is sufficiently increased. The maximum grain size of the diamond grains is more preferably not more than twice the average grain size of the diamond grains.

(3) Absence of a layer formed of diamond grains exhibiting abnormal grain growth; when abnormal grain growth at the interface of the diamond grains is suppressed, PCD 2 can have a structure free of the above-described layer formed due to continuity of diamond grains exhibiting abnormal grain growth. While this structure may include a structure in which diamond grains exhibiting abnormal grain growth are interspersed, more preferably, this structure is free of the above-described layer, and contains no interspersed diamond grains exhibiting abnormal grain growth. As used herein, the term "diamond grains exhibiting abnormal grain growth" in this case refers to diamond grains having a grain size more than three times the volume average grain size.

The diamond grains forming PCD 2 can include one of, or two or more of, the features (1) to (3) set forth above.

(Sintering Aid)

Examples of the sintering aid may include those known for use as sintering aids of diamond grains. Examples thereof may include iron group metals such as cobalt (Co), iron (Fe), and nickel (Ni), titanium (Ti), zirconium (Zr), hafnium (Hf), vanadium (V), niobium (Nb), tantalum (Ta), chromium (Cr), molybdenum (Mo), tungsten (W), and manganese (Mn). Among the above, Co is suitably used as the sintering aid of the diamond grains, because of its high rate of the solution-reprecipitation reaction of diamond grains that drives neck growth formation between the diamond grains.

Note that although Ti or the like (an element from those mentioned above other than the iron group metals) does not inherently have catalytic action to promote neck growth between the diamond grains, when an appropriate amount of Ti or the like is added together with an iron group metal (Co, Fe, or Ni) or the like having the catalytic action to promote neck growth between the diamond grains, Ti or the like is presumed to serve as a getter for excess carbon during dissolution of carbon in the sintering aid, without inhibiting the catalytic action of the iron group metal or the like. Furthermore, Ti or the like is presumed to react with the diamond grains to form a carbide, thereby achieving the improved bonded strength between the diamond grains and suppressed abnormal grain growth described above.

In order to suppress abnormal grain growth, etc., the amount of Ti or the like added is preferably 80 vol % or less based on the total amount of the sintering aid. If the amount of Ti or the like exceeds 80 vol %, the amount of the iron group metal or the like with the catalytic action may become insufficient, leading to a significant loss of neck growth.

The proportion of Co contained in PCD 2 is preferably not less than 2 vol % and not more than 30 vol %. If the proportion of Co contained in PCD 2 is less than 2 vol %, the bond between the diamond grains tends to be weak, or the degree of the bond tends to be uneven. On the other hand, if the proportion of Co is more than 30 vol %, the strength such as chipping resistance, shock resistance, etc., as well as the wear resistance, of PCD 2 will decrease. When the sintering aid contains one or more of the above-mentioned elements other than Co, the proportion of the element(s) other than Co contained in the binder of PCD 2 is preferably not less than 0.1 vol % and not more than 80 vol %.

When the sintering aid is made of Co alone, the proportion of Co contained in PCD 2 can be calculated as in the method of calculating the proportion of the contained diamond grains. When the sintering aid contains another element other than Co, the proportion (wt %) of each of Co and the other element can be calculated using ICP (Inductively Coupled Plasma) analysis.

<Hard Substrate>

Hard substrate 3 is an alloy containing WC as a base material and containing Co, i.e., a so-called WC-based cemented carbide. This hard substrate 3 can have a high hardness and a high strength. While the thickness (in the vertical direction in FIG. 1) of hard substrate 3 in bonded PCD body 1 is not particularly limited, generally, hard substrate 3 having a thickness of about 3 mm is used. Hard substrate 3 may also contain another iron-group metal in addition to Co.

<Hard Layer>

Hard layer 4, which is a layer provided between PCD 2 and hard substrate 3 to be firmly bonded therebetween, contains cobalt and hard grains made of a carbide, a nitride, or a carbonitride having a Vickers hardness of 1100 Hv or more. That is, hard layer 4 has a hard phase made of the above-described hard grains that have been sintered and a second binder phase made of Co. Note that the hard layer contains inevitable impurities in addition to the hard grains and Co.

The proportion of Co contained in hard layer 4 is preferably not less than 5 vol % and not more than 30 vol %, and more preferably not less than 15 vol % and not more than 25 vol %. If the proportion of Co is less than 5 vol %, absorption of Co into the hard layer will become insufficient, possibly causing abnormal grain growth. On the other hand, when the proportion of Co is 15 vol % or more, hard layer 4 can have a high bending strength, so that breaking of hard layer 4 per se can be suppressed. Moreover, if the proportion of Co exceeds 30 vol %, the bending strength of hard layer 4 per se may decrease.

The proportion of Co contained in hard layer 4 can be calculated as in the method of calculating the proportion of the contained diamond grains. The proportion of Co contained in hard layer 4 can also be calculated by measuring a cross section of hard layer 4 using an electron backscatter diffraction pattern (EBSD).

A thickness d of hard layer 4 is preferably not less than 10 μm and not more than 400 μm, and more preferably not less than 10 μm and not more than 150 μm. Thickness d of hard layer 4 depends on the grain size, the total volume (cm$^3$), and the like of the hard grains. If thickness d is less than 10 μm, the region where Co can be retained within hard layer 4, i.e., the region that can form the second binder phase, may become small, leading to an insufficient ability of hard layer 4 to absorb Co. On the other hand, if thickness d exceeds 400 μm, the region that can form the second binder phase within hard layer 4, i.e., the region to be filled with Co, may become so large that the bond formed between the hard grains with Co may become uneven. As a result, hard layer 4 may not be sintered well and become brittle.

(Hard Grains)

The hard grains are made of a carbide, a nitride, or a carbonitride having a Vickers hardness of 1100 Hv or more. Examples thereof may include alloys such as WC, $W_2C$, TiC, ZrC, HfC, NbC, TaC, $Cr_3C_2$, $Mo_2C$, SiC, $B_4C$, VC, TiN, ZrN, VN, NbN, CrN, $Si_3N_4$, BN, TiCN, SiCN, etc. Because of a high hardness of the hard grains, hard layer 4 can have a high hardness. This can suppress a decrease in the strength of bonded PCD body 1 due to the presence of hard layer 4.

With respect to the above-listed alloys, WC, TiC, ZrC, HfC, VC, NbC, $Cr_3C_2$, SiC, BN, TiCN, and SiCN are preferable in that they have a high hardness. WC is more preferable because when hard layer 4 and hard substrate 3 are analogous in properties, the bonded strength between hard layer 4 and hard substrate 3 further increases, and the stress difference between hard layer 4 and hard substrate 3 is minimized.

The grain size of the above-described hard grains is preferably not less than the grain size of the diamond grains. Note that the grain size of the hard grains contained in hard layer 4 will be the same as the grain size of the hard grains used as the material of hard layer 4, i.e., of the unsintered hard grains. When the grain size of the hard grains is not less than that of the diamond grains, the bonded strength of bonded PCD body 2 further increases. Although the reason therefor is not clear, the present inventors consider it as follows.

If the grain size of the hard grains forming hard layer 4 is less than the grain size of the diamond grains, the grain size of the unsintered hard grains as the material of hard layer 4 will also be less than the grain size of the unsintered diamond grains as the material of the PCD. For facilitating the description, the unsintered hard grains will be hereinafter referred to as "pre-hard grains", the unsintered diamond grains as "pre-diamond grains", and the unsintered hard substrate as a "pre-hard substrate".

In order to manufacture the bonded PCD body using these pre-hard grains, pre-diamond grains, and pre-hard substrate, a compact is formed by laminating, in the following order, the pre-hard substrate, a layer (layer A) obtained by molding the pre-hard grains into a layer having a given thickness, and a layer (layer B) obtained by molding the pre-diamond grains and the sintering aid into a layer having a given thickness, and then this compact is sintered.

At this time, if the pre-hard grains have a grain size less than the grain size of the pre-diamond grains, at the interface between layer A and layer B, the pre-diamond grains forming the interface will contact (be adjacent to) each other excessively, leading to formation of diamond grains exhibiting abnormal grain growth. As a result, the bonded strength of the bonded PCD body will decrease. In contrast, when the pre-hard grains have a grain size not less than the grain size of the pre-diamond grains, this formation of abnormal grain growth can be suppressed.

The above-described hard grains preferably have an aspect ratio of 2.5 or less, and more preferably 1.5 or less. When the hard grains have an aspect ratio of 2.5 or less, the bonded strength of bonded PCD body 2 further increases. Although the reason therefor is not clear, the present inventors consider it as follows.

If the aspect ratio of the hard grains contained in hard layer 4 is more than 2.5, the aspect ratio of the pre-hard grains as the material of hard layer 4 will also be more than 2.5. The pre-hard grains having an aspect ratio more than 2.5 can be assumed to be columnar crystal-shaped grains, unlike equiaxed crystal-shaped grains having an aspect ratio of 2.5 or less. If the columnar crystal-shaped grains are molded into layer A having a given thickness, they tend to be molded with a smaller amount of gaps between the grains than the equiaxed crystal-shaped grains. The smaller amount of gaps within layer A will reduce the ability of layer A to absorb Co diffused from the pre-hard substrate into the pre-diamond grains during sintering. This causes excess Co to diffuse into the diamond grains to cause formation of diamond grains exhibiting abnormal grain growth, resulting in a lower bonded strength of the bonded PCD body.

In contrast, when the hard grains are equiaxed crystal-shaped grains and having an aspect ratio of 2.5 or less, this formation of abnormal grain growth can be suppressed. Furthermore, the columnar crystal-shaped grains having an aspect ratio more than 2.5 may have an uneven stress distribution within the grains when subjected to a stress, and thus, experience a decrease in strength per se. The equiaxed crystal-shaped grains having an aspect ratio of 2.5 or less, however, are unlikely to experience such a decrease in strength.

As used herein, the term "aspect ratio" refers to a ratio of the major axis to the minor axis (major axis/minor axis) of the hard grains. The above-described aspect ratio is also an average of the aspect ratios of the hard grains contained in hard layer 4. Hard layer 4, therefore, may contain columnar crystal-shaped hard grains having an aspect ratio more than 2.5. However, in order to exhibit a high Co absorption effect and provide a high strength of hard layer 4, the proportion of columnar crystal-shaped hard grains having an aspect ratio more than 2.5 contained in hard layer 4 is preferably 10 vol % or less. More preferably, hard layer 4 is free of columnar crystal-shaped hard grains having an aspect ratio more than 2.5.

Furthermore, the present inventors found that when pre-hard grains made of WC having a grain size less than 0.3 μm are sintered, regardless of the fact that all of the pre-hard grains are equiaxed crystal-shaped grains, columnar crystal-shaped hard grains are produced in the hard layer. Although effects according to this embodiment can be obtained even if the hard layer contains only a small amount of columnar crystal-shaped hard grains, if the grain size of the pre-hard grains is less than 0.3 the amount of the columnar crystal-shaped hard grains tends to be large, possibly resulting in a reduced bonded strength of the bonded PCD body. The grain size of the above-described hard grains, therefore, is more preferably 0.3 μm or more, and still more preferably 0.5 μm or more.

Furthermore, the grain size of the above-described hard grains is preferably not more than the thickness of hard layer 4, and more preferably not more than ½ the thickness of hard layer 4. If the grain size of the hard grains exceeds the thickness of hard layer 4, the thickness of hard layer 4 may become uneven, and the bonded strength between PCD 2 and hard layer 4, as well as the bonded strength between hard substrate 3 and hard layer 4, may decrease. Moreover, when the grain size of the hard grains is not more than ½ the thickness of hard layer 4, the thickness of hard layer 4 can become more even, and a sufficient region of the second binder phase for containing Co can be assured.

The grain size and the aspect ratio of the hard grains of hard layer 4 can be measured using the following method. With respect to the grain size, first, a cross section of sintered polycrystalline diamond body 2 is mirror-polished, and a reflection electron image of a given region of sintered polycrystalline diamond body 2 is observed at a magnification of 5000 times with an electron microscope. Next, in this reflection electron image, a diameter of a circle circumscribing a hard grain forming the hard phase (i.e., a diameter corresponding to a circumcircle) is measured, and this diameter is determined as the grain size of the hard grain. With respect to the aspect ratio, in the same reflection electron image, the major and minor axes of the hard grain forming the hard phase are measured, and the ratio between them is calculated.

Hard layer 4 may also contain diamond grains. These diamond grains are, for example, the diamond grains used for forming PCD 2 that are mixed into hard layer 4 in the manufacturing process of bonded PCD body 1. Alternatively, for example, the diamond grains are intentionally mixed as a material of hard layer 4 for formation of hard layer 4.

Note, however, that the amount of the diamond grains contained in hard layer 4 is preferably 10 vol % or less, and more preferably, hard layer 4 is free of the diamond grains. If the diamond grains are present in hard layer 4 in a proportion exceeding 10 vol %, there is a higher possibility that abnormal grain growth of diamond grains may be present, possibly leading to a reduced bonded strength of bonded PCD body 1.

Second Embodiment

Tool Including Bonded PCD Body

Figure 3:
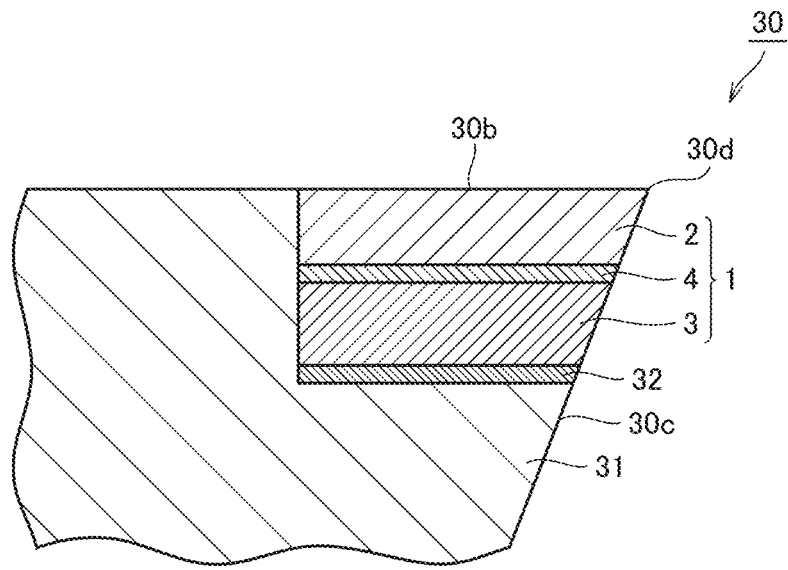
FIG. 3 is a schematic cross-sectional view of a portion of a diamond bit including the bonded PCD body according to one embodiment.

A diamond bit will be described as an example of a tool according to one embodiment. FIG. 3 is a schematic cross-sectional view of a portion of a diamond bit including the bonded PCD body according to one embodiment. Referring to FIG. 3, diamond bit 30 mainly includes a base metal 31, a brazing layer 32, and bonded PCD body 1 having PCD 2, base substrate 3, and hard layer 4. Base metal 31 and brazing layer 32 are each made of an electricity conducting material whose electrical characteristics show metallic properties. Specifically, base metal 31 is preferably made of a metal such as an iron-based metal, a cemented carbide or the like. Brazing layer 32 also preferably contains silver, titanium, or an alloy thereof.

In diamond bit 30, bonded PCD body 1 is fixed to base metal 31 with brazing layer 32 therebetween. Bonded PCD body 1 is positioned in a region of contact with a workpiece for diamond bit 31, and serves as a cutting edge of diamond bit 31. For efficiently cutting the workpiece, bonded PCD body 1 also includes a rake face 30$b$ and a flank face 30$c$. A cutting edge 30$d$ is formed at a portion of contact between rake face 30$b$ and flank face 30$c$. Diamond bit 31 as described above can be produced using a known method.

Diamond bit 30 according to this embodiment has bonded PCD body 1 having a high bonded strength. This suppresses detachment of bonded PCD body 1 during machining of the workpiece, and therefore, diamond bit 30 can have high chipping resistance. Hence, diamond bit 30 can also have a longer lifetime as a tool.

The tool according to this embodiment is not limited to diamond bit 30 described above. Examples of the tool may include other cutting tools (not shown) such as a drill, an end mill, etc.; wear-resistant tools (not shown) such as a dresser, a stylus, a nozzle, a die, etc.; and grinding tools (not shown) such as a grindstone, a wire saw, a blade, a bit, etc. These cutting tools, wear-resistant tools, and grinding tools can also have high chipping resistance and a longer lifetime by including bonded PCD body 1, similarly to diamond bit 30 described above.

Third Embodiment

Method for Manufacturing Bonded PCD Body

Figure 4:
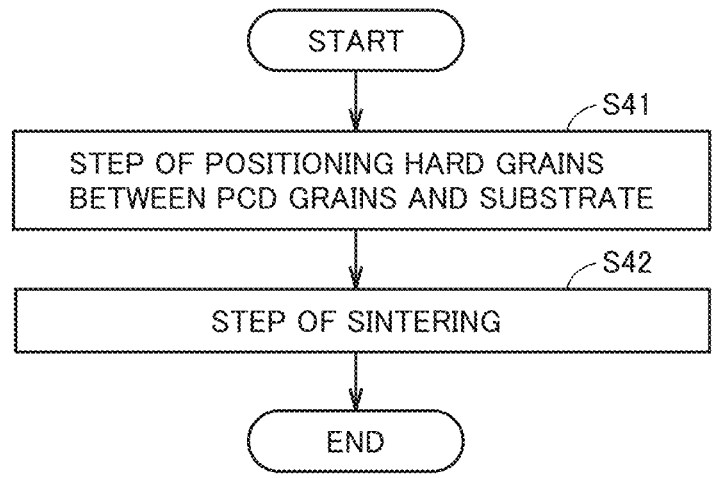
FIG. 4 is a flow diagram for schematically illustrating a method for manufacturing the bonded PCD body according to one embodiment.
Figure 5:
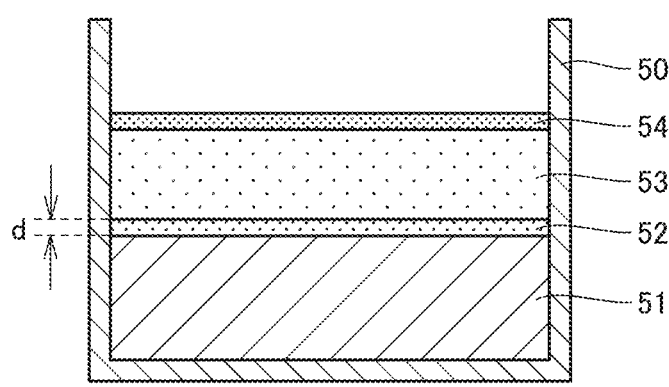
FIG. 5 is a cross-sectional view for schematically illustrating a positioning step in FIG. 4.

FIG. 4 is a flow diagram for schematically illustrating a method for manufacturing the bonded PCD body according to one embodiment. FIG. 5 is a cross-sectional view for schematically illustrating a positioning step in FIG. 4. The method for manufacturing bonded PCD body 1 according to this embodiment will be described with FIGS. 4 and 5.

(Positioning Step)

First, in step S41 shown in FIG. 4, the hard grains are positioned between the diamond grains and the hard substrate (S41: positioning step). Specifically, referring to FIG. 5, hard substrate 51 is first positioned within a mold 51 made of a material having high heat resistance such as tantalum, and hard grains 52 are positioned thereon as a layer having a predetermined thickness d. Then, on this layer made of hard grains 52, diamond grains 53 are positioned as a layer having a predetermined thickness. A sintering aid 54 is then positioned on this layer of diamond grains 53. In this way, a compact is prepared in which hard substrate 51, hard grains 52, diamond grains 53, and sintering aid 54 are laminated in this order.

Hard substrate 51 used in this step is an alloy containing WC as a base material and containing Co, i.e., a so-called WC-based cemented carbide. While the thickness (in the vertical direction in FIG. 5) of hard substrate 51 is not particularly limited, generally, hard substrate 51 having a thickness of about 3 mm is used. Note that although hard substrate 51 will experience a change in the amount of Co therein after the sintering step described below, this change does not alter the shape, properties, characteristics, and performance of hard substrate 51. That is, hard substrate 51 and hard substrate 3 (in the first embodiment) differ only in their Co content.

Hard grains 52 used in this step are made of a carbide, a nitride, or a carbonitride having a Vickers hardness of 1100 Hv or more. A variety of alloys can be mentioned as examples of the carbide, nitride, or carbonitride, as discussed in the first embodiment. Hard grains 52, after the sintering step described below, will change into hard layer 4 (sintered body) in which hard grains 52 are bonded to each other with Co as the sintering aid. Note, however, that the shape, properties, characteristics, and performance of hard grains 52 do not change before and after the sintering step.

Therefore, for example, when the grain size of hard grains 52 is set not less than the grain size of diamond grains 53, the grain size of the hard grains in hard layer 4 in the resulting bonded PCD body 1 can be set not less than the grain size of the diamond grains. Moreover, when hard grains 52 have an aspect ratio of 2.5 or less, the hard grains in hard layer 4 can have an aspect ratio of 2.5 or less. The "thickness of hard layer 4" in the first embodiment is also the same as thickness d of the layer made of hard grains 52, for the reason described above. Therefore, for example, when the grain size of hard grains 52 is set not more than thickness d of the layer made of hard grains 52, the grain size of the hard grains in the resulting bonded PCD body 1 can be set not more than the thickness of hard layer 4.

Note, however, that if the layer made of molded hard grains 52 has a low filling density, there is a concern that the thickness of the layer may change before and after the sintering step. It is thus preferable to increase the filling ratio in advance, by molding the layer made of hard grains 52 by applying a load (for example, a load not less than 15 tons and not more than 20 tons) to hard grains 52.

Note that while the grain size of the hard grains is calculated with an electron microscope in the first embodiment, the grain size of hard grains 52 can also be calculated using another method in this embodiment, for example, based on a grain size distribution measured using laser diffractometry. Similarly, the aspect ratio can also be calculated using another method, for example, based on a grain shape measured using a flow-type particle image analysis method.

Details of diamond grains 53 used in this step are the same as the details of the diamond grains described in the first embodiment, and thus, description thereof will not be repeated. That is, the shape, properties, characteristics, and performance of diamond grains 53 do not change before and after the sintering step. Note that the grain size of diamond grains 53 can also be calculated in a similar manner to the grain size of hard grains 52, based on a grain distribution measured using laser diffractometry.

Details of sintering aid 54 used in this step are also the same as the details of the sintering aid described in the first embodiment, and thus, description thereof will not be repeated.

Now with respect to bonded PCD body 1 manufactured using the manufacturing method according to this embodiment, the proportion of Co contained in hard layer 4 is preferably not less than 5 vol % and not more than 30 vol %, as described above. In order to design the proportion of Co contained in hard layer 5 within the above-defined range, it is preferable to conduct, for example, the following preliminary study. First, the same hard substrate as hard substrate 51 used is prepared. On this hard substrate, layers made of various hard grains are molded while changing the grain size, the aspect ratio, and the amount of the hard grains used, and the resulting layers are sintered. After sintering, the proportions of Co contained in the hard layers produced on the hard substrate are calculated. After this preliminary study, hard grains 52 suitable for each of hard substrates 51 having various compositions can be selected.

While the method of molding diamond grains 53 and sintering aid 54 into different layers have been described in the positioning step detailed above, diamond grains 53 and sintering aid 54 may be molded into a single layer using a mixed powder formed by mixing them in a ball mill or the like. When sintering aid 54 and diamond grains 53 are molded into the different two layers as described above, a sintered body having a layer containing the diamond grains at a high density is obtained. This sintered body has excellent strength and wear resistance. On the other hand, when sintering aid 54 and diamond grains 53 are molded into a single layer using the mixed powder, a sintered body having a uniform degree of neck growth throughout the sintered body can be obtained.

Alternatively, a paste formed by mixing diamond grains 53 and 1 to 50 wt % of a Co powder based on the total amount may be applied onto a layer made of hard grains 52, and a layer may be molded thereon using diamond grains 53 or the mixed powder of diamond grains and the sintering aid. In this case, the cobalt-rich layer described above can be provided within PCD 2 in bonded PCD body 1. Furthermore, when it is determined that the amount of Co to be transferred to the layer made of hard grains 52 is small, a predetermined amount of Co may be positioned together with hard grains 52. This allows the degree of sintering hard layer 4 to be increased in the resulting bonded PCD body 1. Note, however, that from the viewpoint of increasing the bonded strength between PCD 2 and hard substrate 3, Co is preferably not positioned with hard grains 52.

(Sintering Step)

Next, in step S42 shown in FIG. 4, the molded compact is sintered (S42: sintering step). Specifically, the compact is sintered under a pressure not less than 5.0 GPa and not more than 7.5 GPa and a temperature not less than 1300° C. and not more than 1900° C. While the sintering time is not particularly limited and may vary as appropriate depending on the size, thickness, etc., of the compact, sintering of at least 10 minutes or longer can produce sufficiently sintered bonded PCD body 1.

After the foregoing steps, bonded PCD body 1 is manufactured that includes PCD 2 formed by sintering diamond grain 53 with sintering aid 54, hard substrate 3 formed by sintering hard substrate 51, and hard layer 4 containing Co and the hard grains formed by sintering hard grains 52 (see FIG. 1). Note that the reason why Co is contained in hard layer 4 is the same as described in the first embodiment, and thus, description thereof will not be repeated. The resulting bonded PCD body 1, which has a high bonded strength, can provide high chipping resistance when used for tools, for example.

Furthermore, with the manufacturing method according to this embodiment, bonded PCD body 1 having a high bonded strength can be manufactured in good yield. A reason therefor is as follows. As will be described in detail in EXAMPLES below, study by the present inventors confirmed that when bonded PCD bodies not including the hard layer are manufactured at sintering temperatures of 1470° C., 1500° C., and 1530° C., using a conventional manufacturing method, each of the resulting bonded PCD bodies experiences a significant change in bonded strength. In contrast, with the manufacturing method according to this embodiment, it was confirmed that each of the bonded PCD bodies manufactured under the respective temperature conditions has a bonded strength higher than that obtained with the conventional method, and moreover, the bonded strength does not significantly vary between the respective temperatures. That is, with the manufacturing method according to this embodiment, it is possible to manufacture bonded PCD body 1 having a bonded strength higher than that obtained with the conventional method, and to manufacture bonded PCD body 1 showing little change in bonded strength even if it is subjected to some change in temperature conditions.

EXAMPLES

The present invention will be described in more detail below with reference to Examples, which are not intended to limit the present invention.

<<Study 1>>

Effects of the sintering temperature upon bonded PCD bodies were studied.

Examples 1 to 4

In Example 1, a WC-based cemented carbide (product name: GR35, manufactured by A. L. M. T. Corp.) was positioned within a mold made of tantalum, and 3.0 g of a WC powder (product name: MAS900, manufactured by H. C. Starck) having a grain size (volume average grain size) of 4 μm and an aspect ratio of 1.0 was positioned on the WC-based cemented carbide while being compressed at a load of 15 tons, thereby forming a 40 μm thick layer. Next, 11 g of a diamond powder having a grain size (volume average grain size) of 0.8 μm was positioned as a layer on the WC grains, and then 4.0 g of a Co powder was positioned as a sintering aid on the diamond powder, thereby preparing a compact. The mold including the compact was then allowed to stand in a sintering furnace. The pressure within the furnace was elevated to 7.2 GPa, and the temperature within the furnace was elevated to 1470° C. The compact was subsequently sintered while maintaining these conditions for 10 minutes. A bonded PCD body was thus manufactured.

In Examples 2 to 4, bonded PCD bodies were manufactured as in Example 1, except that the temperature within the furnace was elevated to 1500° C., 1530° C., and 1560° C., respectively.

Comparative Examples 1 to 4

In Comparative Examples 1 to 4, bonded PCD bodies were manufactured as in Examples 1 to 4, respectively, except that the WC powder described above was not positioned.

<Evaluation>

A predetermined size of a bonded PCD body test specimen was cut out from each of the bonded PCD bodies manufactured in Examples 1 to 4 and Comparative Examples 1 to 4. A bonded strength of the bonded PCD body test specimen was then measured with shearing tester 20 shown in FIG. 2.

Specifically, each of the bonded PCD body test specimens was fixed in shearing tester 20 such that only the region of the WC-based cemented carbide was located within retaining portion 22a to ensure that the hard layer became exposed from retaining portion 22a. Note that care was taken to locate an equal region of each test specimen within retaining portion 22a. Head 23 was then pressed against each test specimen to apply a load thereto, and the load at which each test specimen was broken was determined as the bonded strength of each bonded PCD body. Furthermore, the proportion of Co contained in the hard layer in each Example was calculated using an EBSD. The results are shown in Table 1.

TABLE 1

|  | Sintering Temperature (° C.) | Bonded Strength (kgf/mm$^2$) | Proportion (vol %) of Co Contained in Hard Layer |
|---|---|---|---|
| Ex. 1 | 1470 | 103.4 | 15.2 |
| Ex. 2 | 1500 | 105.3 | 18.7 |
| Ex. 3 | 1530 | 99.1 | 24.0 |
| Ex. 4 | 1560 | 92.5 | 23.6 |
| Comp. Ex. 1 | 1470 | 65.3 | — |
| Comp. Ex. 2 | 1500 | 55.3 | — |
| Comp. Ex. 3 | 1530 | 33.4 | — |
| Comp. Ex. 4 | 1560 | 11.6 | — |

Referring to Table 1, the bonded strength was confirmed to be 90 kgf/mm$^2$ or more in Examples 1 to 4, while the bonded strength was confirmed to be merely 65.3 kgf/mm$^2$ at the highest in Comparative Examples 1 to 4. Moreover, in Examples 1 to 4, each of the resulting bonded PCD bodies had a high bonded strength even though the sintering temperature was changed within the range of 1470° C. to 1560° C. In contrast, in Comparative Examples 1 to 4, each of the resulting bonded PCD bodies experienced a significant change caused by similarly changing the sintering temperature.

<<Study 2>>

Simulations of internal stress were conducted using the bonded PCD bodies according to Example 2 and Comparative Example 2.

Figure 6:
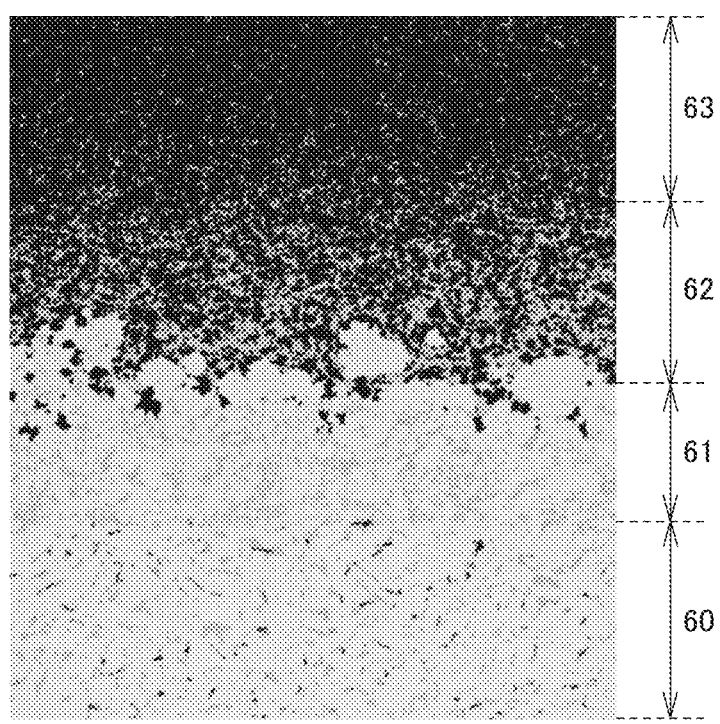
FIG. 6 is a diagram showing an electron micrograph of a bonded PCD body according to Example 2.
Figure 7:
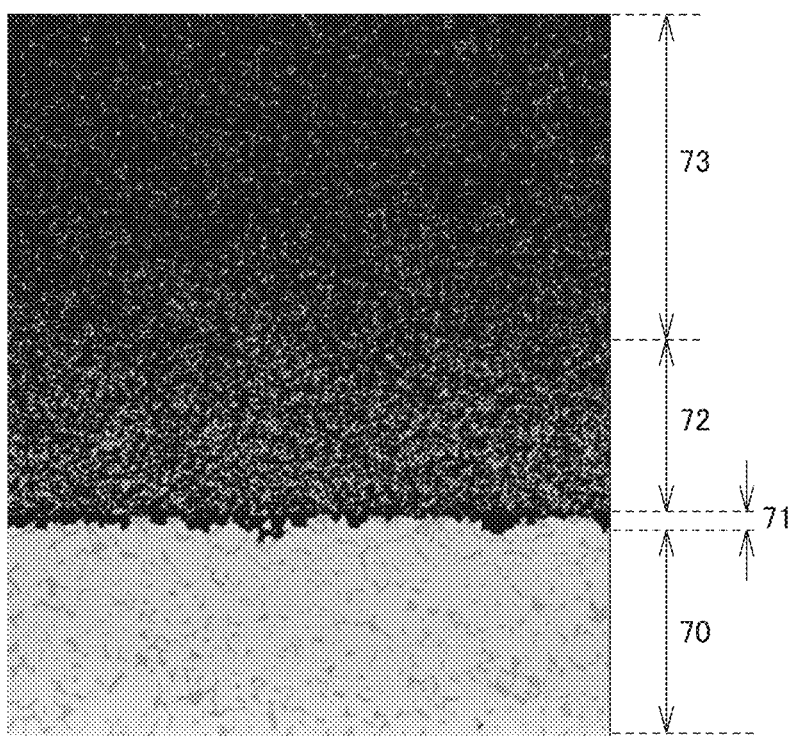
FIG. 7 is a diagram showing an electron micrograph of a bonded PCD body according to Comparative Example 2.

Specifically, the structure of each of the bonded PCD bodies according to Example 2 and Comparative Example 2 was first observed with an electron microscope. The results are shown in FIGS. 6 and 7. Each of FIGS. 6 and 7 shows a surface (surface including each interface) of each of the bonded PCD bodies observed at a magnification of 2000 times. In FIGS. 6 and 7, white regions represent WC, gray regions represent Co, and black regions represent diamond (C). In FIG. 6, a region 60 defines the WC-based cemented carbide, a region 61 defines the hard layer (WC grain region), and regions 62 and 63 define the PCD. In particular, region 62 corresponds to the cobalt-rich layer. In FIG. 7, a region 70 defines the WC-based cemented carbide, a region 71 defines an abnormal grain growth region where diamond grains exhibited excessively large grain growth, and regions 72 and 73 define the PCD. In particular, region 72 corresponds to the cobalt-rich layer.

Next, each of regions 60 to 63 and 70 to 73 in each of the obtained images was binarized by image processing, and proportions of Co and Wc or proportions of Co and diamond (C) contained in each of the regions were calculated. From the calculated proportion, a thermal expansion efficient of each of regions 60 to 63 and 70 to 73 was calculated. A thickness of each region was also calculated using the same observation image, and a volume of each region was calculated therefrom. Note that for regions 60 and 70, catalog values were cited with respect to thermal expansion coefficient and volume.

Stress differences induced between the regions were then calculated from the determined thermal expansion coefficients and volumes of the regions. As a result, in the bonded PCD body according to Example 2, the stress difference at the interface between regions 62 and 61 was the highest and 2.0 GPa, while in the bonded PCD body according to Comparative Example 2, the stress difference at the interface between regions 70 and 71 was the highest and 3.8 GPa. From these simulation results, it was understood that as a result of comparison between the bonded PCD bodies according to Example 2 and Comparative Example 2, the bonded PCD body according to Comparative Example 2 had a bonded strength lower than that of the bonded PCD body according to Example 2, because of its higher residual stress within the bonded PCD body.

<<Study 3>>

Effects of thicknesses of hard layers upon bonded PCD bodies were studied.

Examples 5 to 10 and Comparative Example 5

In Example 5, a bonded PCD body was manufactured as in Example 2, except that the thickness of the layer made of the WC powder was changed to 10 μm. In Examples 6 to 10 and Comparative Example 5, bonded PCD bodies were manufactured as in Example 5, except that the thickness of the layer made of the WC powder was changed to 40 μm, 70 μm, 150 μm, 200 μm, 400 μm, and 500 μm, respectively.

<Evaluation>

Bonded strengths of the bonded PCD bodies (according to Examples 5 to 10 and Comparative Example 5) were calculated as in Example 2. Furthermore, each of the bonded PCD bodies was inspected for an abnormal grain growth region, and an abnormal grain growth region was determined to be "Present" when the grain growth was 5 μm or more. The results are shown in Table 2. Note that Table 2 also shows the results of Comparative Example 2, for facilitating the consideration.

TABLE 2

|  | Thickness of Hard Layer (μm) | Bonded Strength (kgf/mm$^2$) | Presence/Absence of Abnormal Grain Growth Region |
|---|---|---|---|
| Comp. Ex. 2 | — | 55.3 | Present |
| Ex. 5 | 10 | 117.8 | Absent |
| Ex. 6 | 40 | 110.1 | Absent |
| Ex. 7 | 70 | 112.2 | Absent |
| Ex. 8 | 150 | 114.3 | Absent |
| Ex. 9 | 200 | 87.5 | Absent |
| Ex. 10 | 400 | 76.3 | Absent |
| Comp. Ex. 5 | 500 | 30.0 | Absent |

Referring to Table 2, the bonded strength was confirmed to be high in all of the bonded PCD bodies according to Examples 5 to 10. Furthermore, observation of the structure of the interface between the hard layer and the PCD in each of these test specimens with an electron microscope showed no abnormal grain growth of diamond grains that had grown to a grain size of 5 μm or more. Note, however, that in each of Examples 9 and 10, a significant amount of free carbon precipitated within the hard layer and the hard substrate. This is believed to be because excess Co diffused from the inside of the hard substrate due to a large amount of gaps between the hard grains.

<<Study 4>>

Effects of maximum grain sizes of diamond grains at interfaces of bonded PCD bodies upon bonded PCD bodies were studied.

Examples 11 to 14

In Examples 11 to 14, bonded PCD bodies were manufactured as in Example 2, except that the grain size (volume average grain size) of the diamond grains used was changed to 1.2 μm, 3.1 μm, 4.2 μm, and 35.0 μm, respectively.

<Evaluation>

Bonded strengths of the bonded PCD bodies (according to Examples 11 to 14) were calculated as in Example 2. The results (average value and minimum value of four measurements) are shown in Table 3.

TABLE 3

| | Maximum Grain Size (μm) of Diamond Grains | Average Value of Bonded Strength (kgf/mm$^2$) | Minimum Value of Bonded Strength (kgf/mm$^2$) |
|---|---|---|---|
| Ex. 2 | 1.3 | 105.3 | 97.1 |
| Ex. 11 | 2.1 | 106.3 | 88.7 |
| Ex. 12 | 4.7 | 94.1 | 86.7 |
| Ex. 13 | 7.5 | 81.8 | 80.4 |
| Ex. 14 | 30.3 | 71.5 | 65.5 |

Referring to Table 3, the bonded strength was confirmed to be high in all of the bonded PCD bodies according to Examples 11 to 14. Note that in each of Examples 2 and 11 to 13, the maximum grain size, i.e., the grain size of the diamond grains exhibiting grain growth present at the interface between the hard layer and the PCD, is greater than the volume average grain size of the diamond grains used; in contrast, in Example 14, the maximum grain size was smaller than the volume average grain size of the diamond grains used. This is believed to be because the grain size of the diamond powder used in Example 14 varied greatly, and diamond grains with a large grain size dissolved in Co.

It should be understood that the embodiments and examples disclosed herein are illustrative and non-restrictive in every respect. It is intended that the scope of the present invention is defined by the terms of the claims rather than by the foregoing description, and includes all modifications within the scope and meaning equivalent to the claims.

REFERENCE SIGNS LIST

1: bonded PCD body; 2: PCD; 3: hard substrate; 4: hard layer; 20: shearing tester; 21: mount; 22: column; 23: head; 30: diamond bit; 30b: rake face; 30c: flank face; 30d: cutting edge; 31: base metal; 32: brazing layer; 51: mold; 52: hard grains; 53: diamond grains; 54: sintering aid; 60, 70: region (WC-based cemented carbide); 61: region (hard layer); 62, 72: region (cobalt-rich layer); 63, 73: region; and 71: region (abnormal grain growth region).

The invention claimed is:

1. A bonded diamond body comprising:
a sintered polycrystalline diamond body;
a hard substrate; and
a hard layer provided between the sintered polycrystalline diamond body and the hard substrate,
the sintered polycrystalline diamond body containing a diamond grain and a sintering aid,
the hard substrate containing tungsten carbide and cobalt,
the hard layer containing cobalt and a hard grain made of a carbide having a Vickers hardness of 1100 Hv or more,
the hard layer being free of a diamond grain, and
the sintering aid including cobalt and the proportion of cobalt contained in the sintered polycrystalline diamond body being not less than 2 vol % and not more than 30 vol %,
the hard grain having a volume average grain size not smaller than a volume average grain size of the diamond grain,
the diamond grain having a maximum grain size of 30.3 μm or less, and
a maximum grain size of the diamond grains contained in the polycrystalline diamond body being not more than three times the average grain size of the diamond grains.

2. A bonded diamond body comprising:
a sintered polycrystalline diamond body;
a hard substrate; and
a hard layer provided between the sintered polycrystalline diamond body and the hard substrate,
the sintered polycrystalline diamond body containing a diamond grain and a sintering aid,
the hard substrate containing tungsten carbide and cobalt,
the hard layer containing cobalt and a hard grain made of a carbide having a Vickers hardness of 1100 Hv or more, and
the sintering aid including cobalt and the proportion of cobalt contained in the sintered polycrystalline diamond body being not less than 2 vol % and not more than 30 vol %,
the hard grain having a volume average grain size not smaller than a volume average grain size of the diamond grain,
the diamond grain having a maximum grain size of 30.3 μm or less, and
a maximum grain size of the diamond grains contained in the polycrystalline diamond body being not more than three times the average grain size of the diamond grains.

3. The bonded diamond body according to claim 2, wherein
the hard layer consists of the hard grain and the cobalt.

* * * * *